United States Patent [19]

Wanlass

[11] 4,446,416

[45] May 1, 1984

[54] POLYPHASE ELECTRIC MACHINE HAVING CONTROLLED MAGNETIC FLUX DENSITY

[76] Inventor: Cravens L. Wanlass, 3739 Meadow Wood Rd., Carson City, Nev. 89701

[21] Appl. No.: 66,410

[22] Filed: Aug. 14, 1979

[51] Int. Cl.³ .......................... H02P 1/44; H02P 5/00
[52] U.S. Cl. .................... 318/812; 318/817; 318/729; 318/773
[58] Field of Search ............... 318/794, 795, 797, 812, 318/816, 817, 819, 499, 771–773, 780, 721, 704, 729; 310/198, 184, 185, 202, 203

[56] References Cited

U.S. PATENT DOCUMENTS

| | | | |
|---|---|---|---|
| 623,528 | 4/1899 | Duncan | 318/817 |
| 1,255,400 | 2/1918 | Ferris | 310/184 |
| 1,478,012 | 12/1923 | Varlex . | |
| 1,715,866 | 6/1929 | Rother | 310/198 |
| 1,867,328 | 7/1932 | Rienks | 310/202 |
| 1,912,337 | 5/1933 | Kennedy | 318/817 |
| 1,916,389 | 7/1933 | Ross | 318/817 |
| 2,039,050 | 4/1936 | Ball . | |
| 2,575,716 | 11/1951 | Kilgore | 318/771 |
| 2,703,859 | 3/1955 | Hutchings | 318/797 |
| 3,238,403 | 3/1966 | Sauer | 310/202 |
| 3,324,322 | 6/1967 | Johns | 310/202 |
| 3,348,109 | 10/1967 | Wright | 318/807 |
| 4,063,135 | 12/1977 | Wanlass | 318/795 |
| 4,095,149 | 6/1978 | Wanlass | 318/795 |
| 4,107,583 | 8/1978 | Houtman | 318/724 |

FOREIGN PATENT DOCUMENTS 462172 2/1951 Italy .

1257195 12/1971 United Kingdom ............... 310/198

Primary Examiner—David Smith, Jr.
Attorney, Agent, or Firm—Lyon & Lyon

[57] ABSTRACT

In a polyphase machine, being either a motor or a generator, there is provided a stator core having main stator windings and control windings. In the example of a squirrel cage induction motor these windings are wound about the stator core and the main windings have a capacitor connected in series with each such winding. In a three phase motor the control windings wound on the stator have currents in each phase which are substantially in phase at no load with the currents of the corresponding radially adjacent the main windings. Such currents become out of phase with their main winding currents as the load increases. The control windings are wound in an opposite sense to the corresponding main windings such that a low load the net flux density is low and as the load increases the flux density increases. Increase of starting and breakdown torque is achieved by having the respective poles created by the main windings and those created by the control windings placed to create a force because of the symmetry of the magnetic field. In this case the centers of the poles of the control windings are placed as close as physically possible between the poles of the main windings, thereby improving the magnetic centering of the poles. The voltage across the capacitor added to the input voltage may cause the stator core to switch periodically between non-saturated and saturated conditions.

56 Claims, 9 Drawing Figures

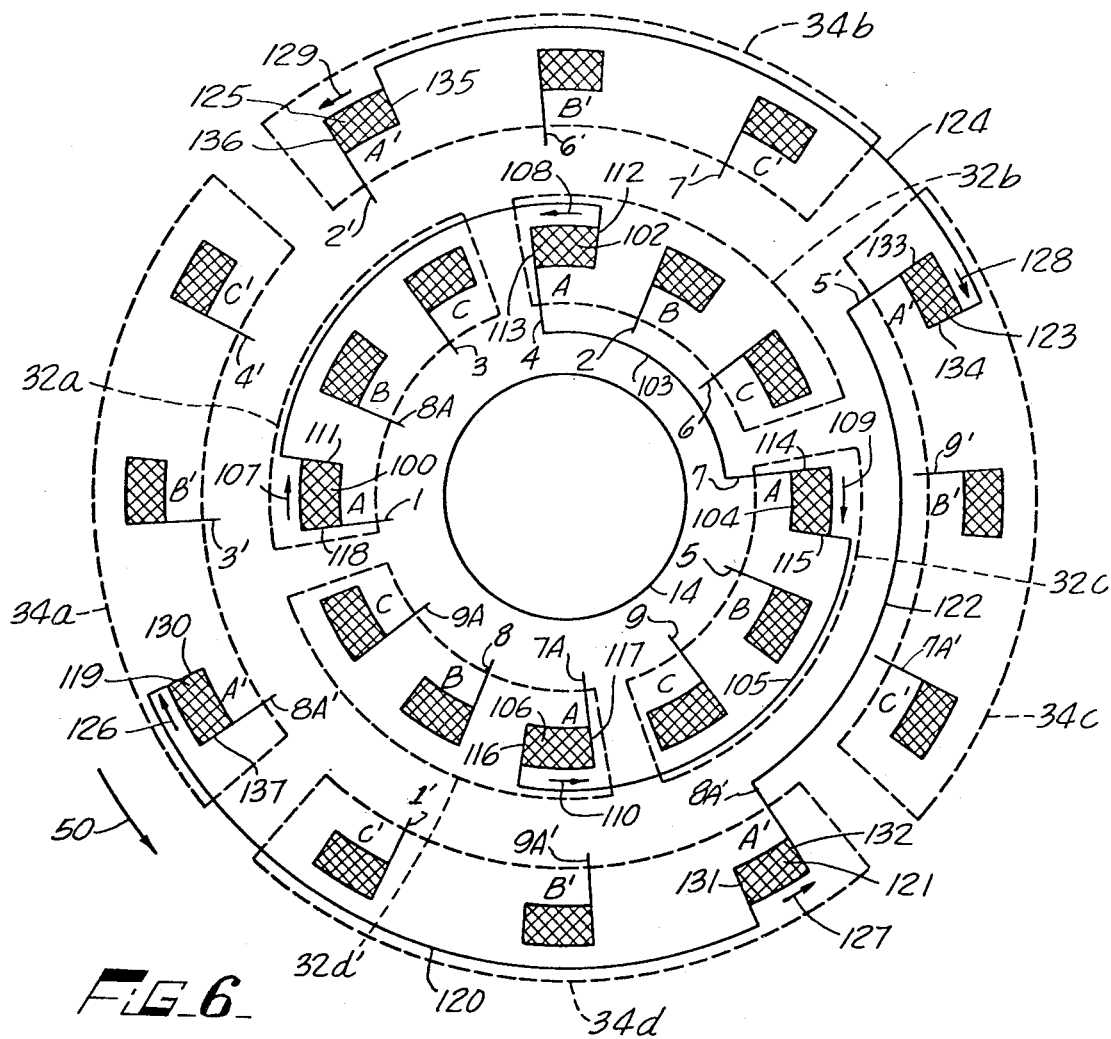
FIG_6
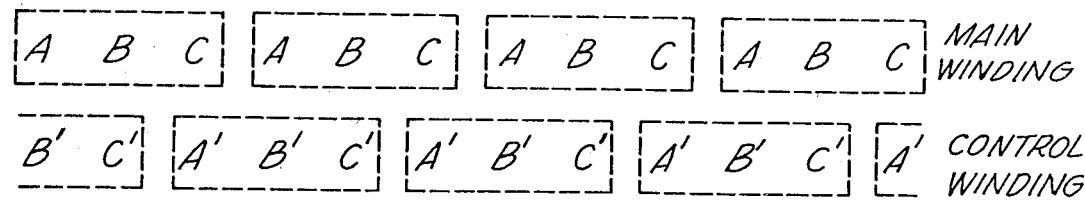
FIG_7

POLYPHASE ELECTRIC MACHINE HAVING CONTROLLED MAGNETIC FLUX DENSITY

RELATED APPLICATIONS

This is a related application to Ser. No. 790,758 filed Apr. 25, 1977, now being U.S. Pat. No. 4,187,457 entitled POLYPHASE ELECTRIC MOTOR HAVING CONTROLLED MAGNETIC FLUX DENSITY, which is a continuation-in-part of Ser. No. 597,529, filed July 21, 1975, now being U.S. Pat. No. 4,063,135 and entitled ELECTRIC MOTOR HAVING CONTROLLED MAGNETIC FLUX DENSITY, the disclosures of which are incorporated by reference herein. The subject matter of this application also relates to the subject matter of applicant's copending application filed concurrently under Ser. No. 66,411. The subject matter of this application also relates to the subject matter of U.S. Pat. No. 4,152,630 entitled IMPROVED MULTIPHASE MOTOR; U.S. Pat. No. 4,095,149 entitled OPTIMIZED ELECTRIC MOTOR HAVING CONTROLLED MAGNETIC FLUX DENSITY; the disclosures of which patents are incorporated by reference herein.

BACKGROUND OF THE INVENTION

This invention relates to polyphase electric machines, being motors and generators. The invention is described with reference to motors, particularly three phase motors, but as indicated the invention is not so restricted.

Present day induction motors such as the squirrel cage type have numerous limitations. For example, when heavily loaded, they draw excessive currents as the rotor slows down, which currents can result in motor burn out unless the motor is protected by auxiliary equipment. Such motors must have a high breakaway torque to running torque ratio to prevent motor damage in the event of motor overload, and as a result the flux density must be maintained at non-optimum levels during normal operation. This relatively low flux density during normal operation is also necessitated by potential input voltage variations. Because the flux density must be kept relatively low, the motor size must be substantially larger than would theoretically be necessary in an ideal motor in order to obtain the desired output horsepower. In addition, the output horsepower available from such motors is significantly dependent on the line voltage, and to some extent, line frequency. Another problem encountered in conventional induction motors is the high starting currents inherent in their operation. This also causes the flux density to be higher at low loads than is actually necessary for efficient operation at such loads. Ordinarily, in motors of any size, external current limiting devices must be used, or special and expensive rotor designs employed. These problems exist with regard to single and polyphase motors.

Another problem which is known to exist is that of designing a motor to run through its normal load range efficiently, to provide high power factor, and simultaneously to provide high starting torque and high breakdown torque when required for particular applications.

SUMMARY OF THE INVENTION

The present invention overcomes or reduces the foregoing disadvantages of polyphase electric machines by providing a system in which the magnetic flux density in the stator is maintained at optimum level for requisite load conditions. In addition, the system permits the current in the rotor also to be maintained at an optimum magnitude for requisite load conditions relative to those permitted in conventional electric motors of the induction type. Since the force generated in a conductor is defined by the equation:

$$F = BlI$$

where $F$ = force
where $B$ = flux density
where $l$ = length of the conductor
where $I$ = current in the conductor it can be seen that optimizing the terms B and I for a given l optimizes the force and consequently the torque and horsepower of a motor for a given amount of magnetic material which is present.

According to the present invention, flux density is optimized in a polyphase machine by controlling the flux density in the stator core.

A main polyphase stator winding is wound on a magnetic core, the winding comprising a plurality of windngs and each winding represents a single phase. Capacitors are connected with each of the windings in a series circuit. A polyphase control winding is wound on the core and is connected to input terminals together with the respective main windings and the series connected capacitances. The control windings and the main windings are oppositely wound such that on low load the total flux density from main and control windings substantially radially adjacent each other is low and with increasing load the total flux density increases as the flux generation of the windings become additive with each other.

The polyphase control winding wound on said core to encompass the magnetic material is connected to the input terminals and is positioned physically on the stator so that the vectorial relationship of the currents in the main windings and the currents of the control windings located substantially radially adjacent the main windings cause the vectorial sum of these respective currents to decrease as the load increases towards full load.

The capacitors have a value such that the voltage across the capacitors will, in combination with the input voltage, periodically cause the volt-second capacity of the stator core to be exceeded with the result that the core will periodically change non-linearly from a high to a low flux density condition and back again. The average flux density in the stator core is thus maintained quite high without the danger of high input voltages resulting in extremely high input currents. The capacitors limit the amount of energy that can be transferred to the rotor even if the rotor has a very low impedance so rotor current can also be optimized. The rotor impedance can be made lower than in a conventional motor and the current induced at zero motor speed can be made more optimum than is conventional; yet this current will still have proper value at normal motor operating speeds and normal loads. Thus, the motor of the present invention can be optimized much better than conventional motors for a large number of applications or for any given application.

In preferred forms, by using capacitors in series with the main stator winding and operating the motor magnetic path in soft saturation due to the limiting effect of total energy transfer of the capacitors, the end result is a motor that can be operated at optimized flux density under most conditions of line voltage without resulting in extremely high input currents for high input voltages. In other words, the input current and flux density in the machine would not be extremely non-linear as a function of the line voltage as is presently the case with conventional AC induction and other motors. The present invention makes use of the fact that the inductances of the motor winding can only absorb so much energy before the magnetic material of the motor stator saturates and discharges the capacitors. When the motor magnetic material saturates, the capacitors discharge through the motor winding and the power line source and charge up the capacitors in the opposite polarity. The current through the winding then reverses and the capacitors are then the source of energy and maintain the current flowing through the windings. This continues until the voltage of the input line changes in polarity. The volt-seconds of the input voltage from the line then adds to the volt-seconds that have been applied by the capacitors to the main windings. This continues until the total volt-seconds applied to the main winding exceeds the volt-second capacity of the windings and magnetic material of the motor stator, and then the magnetic material of the motor again saturates. The capacitors then discharge through the motor windings since they have saturated and the line power source charges up the capacitors in the opposite polarity again. The current then reverses once more through the main windings and the capacitors again provide the source of current through the main windings. This continues until the line voltage again changes polarity. As the line voltage amplitude continues to increase the volt-second of the line voltage plus that of the capacitors again are in phase and add until the volt-second capacity of the main windings and associated magnetic material are exceeded. The winding magnetic material again saturates and the inductance of the main winding decreases considerably again causing the capacitors to discharge through the winding. This process is repeated each half-cycle and results in the motor running at maximum flux density and thus maximum force, torque and horsepower.

The present invention allows for optimum flux density and since the voltage across each capacitor is usually higher (although it need not be) than the line voltage, the flux density in the stator core is relatively independent of the line voltage over fairly wide ranges of amplitude. Furthermore, each capacitor prevents excessive currents from passing through the motor winding when the magnetic material saturates since only the energy in the capacitor, i.e., $\frac{1}{2}CV^2$, can be transferred through the respective winding. This limited energy transfer, as governed by the capacitor value (farads) and the voltage across the capacitor (i.e., $\frac{1}{2}CV^2$) prevents excessive currents from the line through the main winding.

The result is an AC motor that will operate over wide ranges of input voltage and operate at a high efficiency and possess excellent operating characteristics. Since the capacitors limit the amount of energy transferred through the main winding each half-cycle, motor burn out is greatly reduced and in some configurations is not normally possible. In the case of motor overload all that will occur is that the motor will stall and the input power to the motor will be greatly reduced. This is due to the fact that the series capacitors will have a much lower voltage across them than normal since the motor is not operating in the controlled phase, and the $\frac{1}{2}CV^2$ energy level is greatly reduced.

In a three phase motor the control windings provided on the stator core are connected in parallel with each of the three main windings and capacitors, and can provide considerably more starting torque for the motor. The control windings are of greater impedance than the main windings and therefore the current through the control windings is relatively low compared, for example, with the main windings of an induction motor.

Furthermore, the control windings serve to limit the input current, because as the input voltage increases, or the motor speed increases, these windings begin to act as generator windings due to the back e.m.f. exceeding the input voltage, and generate a current which counteracts some of the current drawn by the main windings. This, of course, is made possible by the fact that the main windings are the primary source of power to the motor.

The radially adjacent windings are those which are coupled magnetically. In a three phase motor the adjacent control winding current leads the corresponding main winding current at no-load and is substantially in phase, and with increasing load becomes out of phase and increasingly leads towards a maximum 180° vectorial displacement.

With the windings of the main windings and the correspondingly located control windings wound in the opposite sense, on low load the total net flux density is low and with increasing load the flux density increases as the vectorial direction of the current of the corresponding control winding changes.

The main and the control windings each define at least two magnetic poles, the centers of the poles of the main windings and the centers of the poles of the control windings magnetically overlap the respective poles.

In another preferred form of the invention the centers of the poles of the control windings are physically located substantially between the poles of the main windings thereby increasing the starting torque and the breakdown torque of the motor. In such an event the electrical vectorial representation of the currents of the corresponding adjacent main and control windings remains substantially unchanged. The physical and magnetic change provides greater symmetry. In some cases the mechanical slot configuration permits this physical and consequent magnetic location to be achieved only partially.

In yet a further preferred form of the invention the control winding is wound radially outside of the main winding, such that the space between the main winding and the rotor minimizes the leakage reactance of the main winding.

DESCRIPTION OF THE DRAWINGS

FIG. 6 is a physical representation of a polyphase motor according to the present invention.

FIG. 7 is a linear representation of the coils of the windings of a polyphase motor according to the present invention.

DESCRIPTION OF THE INVENTION

Figure 1:
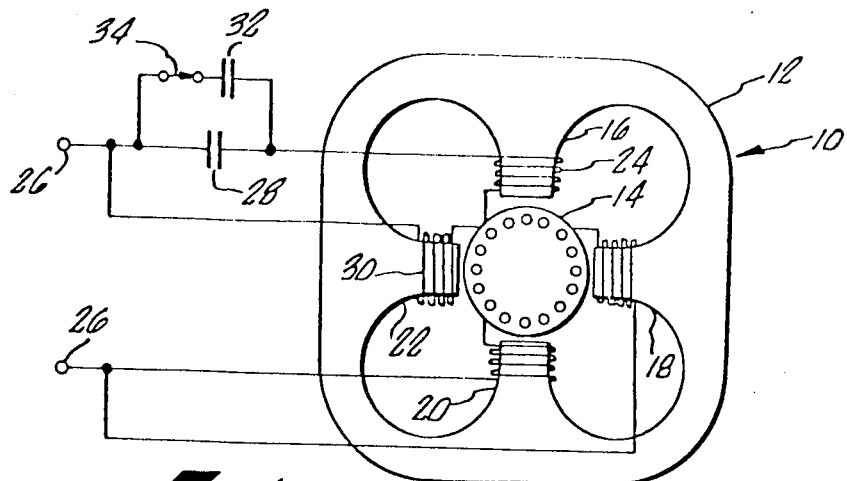
FIG. 1 is a schematic diagram of a preferred embodiment of a single phase motor illustrative of some of the features of the present invention.

FIG. 1 illustrates in schematic form a single phase motor having some of the features of the preferred embodiment of the polyphase machine of the present invention. This is described to facilitate an understanding of the invention. An AC induction motor of the squirrel cage type is generally indicated at 10 and is diagrammatically shown to have a stator 12 of magnetic material and a squirrel cage rotor 14. The stator is shown as having four pole pieces, 16, 18, 20 and 22 although more or less pole pieces may be used if desired. The configuration of the pole pieces is diagrammatic only. The main stator winding 24 is shown as wound on poles 16 and 20 and is connected to input terminals 26 by means of a series capacitor 28. The capacitor 28 need have no particular value, but its capacitance must be large enough to maintain a capacitive power factor in the series circuit comprising this capacitor and the winding 24 during the motor's normal operating mode. An auxiliary winding 30 is wound on pole pieces 18 and 22 and is connected in parallel with winding 24 and capacitor 28. The winding 30 is preferably of higher inductance and impedance than the winding 24. It may, for example, have more turns of finer wire. A starting capacitor 32 is connected across the capacitor 28 by a centrifugal switch 34.

The operation of the motor shown in FIG. 1 is as described above. Briefly, when an AC voltage is applied to the terminals 26, the capacitor 28 begins to charge and a current flows through the winding 24. A current also flows through the winding 30 which is out of phase with the primarily capacitive current in the winding 24 with the result that a rotating field is created which causes the rotor 14 to begin rotating. At this time, a substantial amount of the driving force is produced by the winding 30 inasmuch as the main winding 24 and capacitor 28 has not yet entered into its normal operating mode. As the rotor speed and the back e.m.f. increase, the effective inductance of the winding 24 becomes such that this winding 24, together with the capacitor 28, goes into its operating mode. In other words, the effective volt-second capacity of the winding 24 and its associated magnetic material becomes sufficiently large to permit the operation of the device in the manner described previously, i.e., the capacitor 28 will periodically charge, discharge and recharge in the opposite direction causing the magnetic material associated with the winding 24 to switch from a non-saturated to a saturated condition while maintaining the average flux density quite large.

As the rotor approaches rated speed, the current in the auxiliary winding 30 becomes less and less. Preferably, this winding is designed to have minimum current at rated speed and load and nominal input voltage. In the event the load should increase or the speed otherwise decrease, the winding 30 will draw more current and again contribute to the driving force of the motor. This is very desirable as it provides additional torque for periods of overload, which overload, if the winding 30 was not present, might cause the capacitor 28 and winding 24 to be driven out of its operating mode and the motor to stall.

The capacitor 32, while not necessary, is helpful for increasing starting torque by initially allowing more current to flow through the main winding 24. After the motor reaches a predetermined speed, the centrifugal switch 34 opens, removing the capacitor 32 from the circuit.

In the present invention which relates to a three phase or other polyphase motor a capacitor is provided for each phase. FIGS. 2 through 5 and FIG. 9 illustrate in schematic form various embodiments of three phase motors according to the present invention. In each of FIGS. 2 through 5 and FIG. 9, the three coils making up the main stator winding are designated 24a, 24b and 24c while the three capacitors connected in series with these coils are designated 28a, 28b and 28c, respectively. In the case of such polyphase motors, no starting winding is necessary, but the use of an auxiliary winding is still beneficial for the reasons previously stated. In the case of the present invention the auxiliary winding acts as a control winding for the reasons set out and is thus termed herein, preferably, a control winding. FIGS. 2, 3, 4, 5 and 9 show such control windings, one winding for each phase, these windings being designated as 30a, 30b and 30c. In each figure, the windings are shown connected to appropriate input terminals A, B, and C which correspond to the input terminals 26 in FIG. 1 except, of course, that they are adapted to be connected to a source of three phase voltage rather than single phase voltage. In FIGS. 2, 3, 4 and 9 terminal D is the center point of the wye configuration of the main windings.

Figure 2:
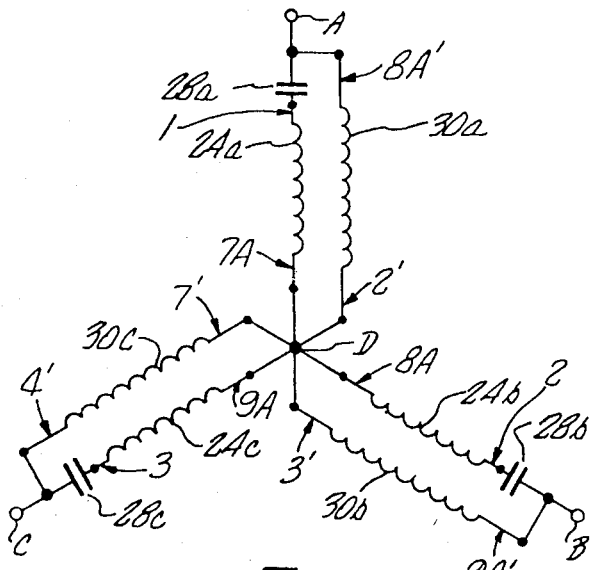
FIG. 2 is a schematic diagram of a first embodiment of a polyphase motor according to the present invention.
Figure 3:
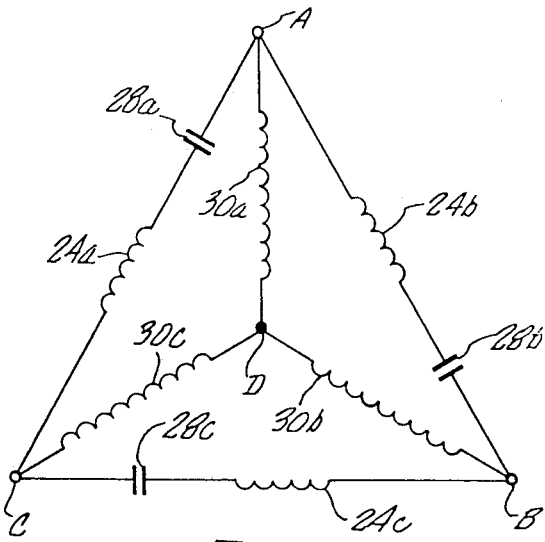
FIG. 3 is a schematic diagram of a second embodiment of a polyphase motor according to the present invention.
Figure 4:
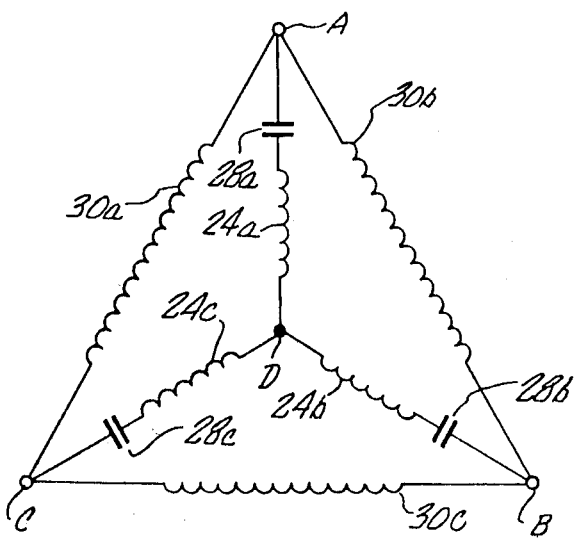
FIG. 4 is a schematic diagram of a third embodiment of a polyphase motor according to the present invention.
Figure 5:
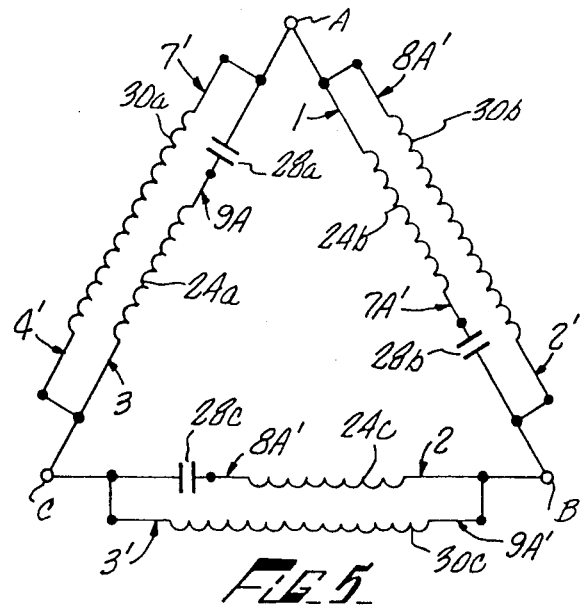
FIG. 5 is a schematic diagram of a fourth embodiment of a polyphase motor according to the present invention.
Figure 9:
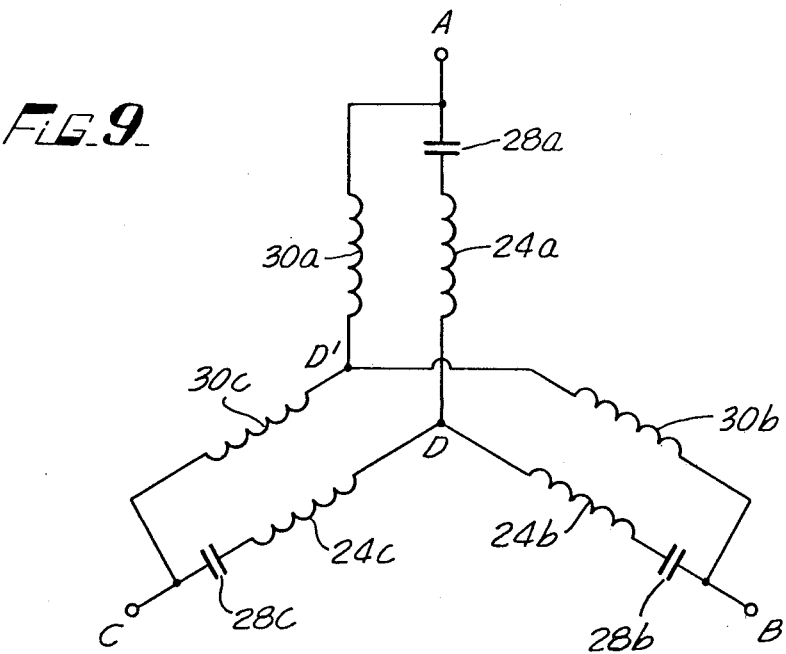
FIG. 9 is a schematic diagram of a fifth embodiment of a polyphase motor according to the present invention.

It is not believed that any extended discussion of the embodiments of FIGS. 2 through 5 and FIG. 9 is necessary as their characteristics, construction and operation will be obvious to one skilled in the art in view of the foregoing description of the single phase embodiment of the motor of the present invention. Briefly, FIG. 2 shows a three phase motor in which the main and control windings are both wound in a wye configuration; FIG. 3 shows the main stator coils 24a, 24b and 24c connected in a delta configuration with the control coils 30a, 30b and 30c connected in a wye configuration; FIG. 4 shows the main stator coils connected in a wye configuration with the control windings connected in a delta configuration; FIG. 5 shows these windings both wound in a delta configuration; and FIG. 9 shows the main windings having a common center point D and the control winings having a separate common center point D', this arrangement permitting for smoother regulation or control than the FIG. 2 arrangement under conditions having rapidly changing load conditions.

Referring to FIG. 6 there is shown the relative physical disposition of twelve groups of coils which constitute the three phases of a motor, each phase having four spaced coil groupings thereby creating a 4-pole motor. The coil groups and poles of the main winding are depicted in clockwise rotation by numerals 1, 8A and 3 (representing phases A, B and C of the first magnetic pole); 4, 2 and 6 (representing phases A, B and C of the second magnetic pole); 7, 5 and 9 (representing phases A, B and C of the third magnetic pole); and 7A, 8 and 9A (representing phases A, B and C of the fourth magnetic pole). Located radially outside of the main windings are the control windings which define magnetic poles magnetically leading the main winding poles by substantially 90°. The order of the poles are such that the rotating fields created by the main windings and the control windings rotate in the same direction. The 90° magnetic leading is equivalent to an approximately 45° physical offset and the magnetic leading effect is illustrated by reading the windings in a counterclockwise sense as indicated by arrow 50. The coil groups and poles of the control windings viewed physically are in a clockwise sense depicted by numerals 8A', 3' and 4' (representing phases, A, B and C of a first magnetic pole); 2', 6' and 7' (representing a second magnetic pole); 5', 9' and 7A' (representing a third magnetic pole); and 8', 9A' and 1' (representing the fourth magnetic pole).

The numerals of the main and control windings refer to the leads from the coil groups constituting a part of each winding, there being four coil groups for each winding of each phase. This is more readily seen by reference to FIGS. 2 and 5 which depict the electrical connections of the four coil groups constituting the windings of each phase.

In FIG. 6 there is illustrated the physical disposition of the coil groupings around the stator. The interconnection of the four coil groups constituting phase A of the main winding and phase A' of the control winding has been illustrated only. The lines interconnecting phases B and C of the main winding and B' and C' of the control winding have not been illustrated for the sake of clarity, but it would be clearly apparent to anyone skilled in the art how these windings would be connected after following the connections for phases A and A' which will now be described.

The coil groupings of phase A which constitute the main winding between leads 1 and 7A commence with coil grouping 100 which is connected by line 101 to coil group 102, which in turn is connected by line 103 to coil group 104, which in turn is connected by line 105 to coil group 106, which has the free lead 7A'. Each of the coil groups in this example has three coils, and it will be seen that adjacent coil groups 100, 102, 104 and 106 are oppositely wound thereby to create opposite poles adjacent each other. Each of the three coils of each coil group is wound in the same sense. Arrows 107, 108, 109 and 110 respectively indicate the direction of the current of each coil group. Line 101 connects the coil groups 100 and 102 at their trailing ends 111 and 112; line 103 connects coil groups 102 and 104 at their leading ends 113 and 114; and line 105 connects coil groups 104 and 106 at their trailing ends 115 and 116. Leads 1 and 7A leave the coil groups 100 and 106 at the leading ends 117 and 118.

The control winding of coil groupings of phase A' is similarly connected between leads 8A' and 2'. Commencing from coil grouping 119, the line 120 connects coil group 121; line 122 connects coil group 121 to coil group 123; line 124 connects coil group 123 to coil group 125. Opposite currents are in radially adjacent windings as depicted by arrows 126, 127, 128 and 129, and a similar trailing and leading connection of the coil groupings as described above with regard to the main windings of phase A exist with regard to the control windings. Line 120 connects the trailing end 130 of coil group 119 with trailing end 131 of coil group 121; line 122 connects the leading end 132 of coil group 121 with leading end 133 of coil group 123; line 124 connects the trailing end 134 of coil group 123 with trailing end 135 of coil group 125. Leads 8A' and 2' leave the coil groups 119 and 125 from leading ends 136 and 137, respectively.

Similarly phase B is defined between leads 2 and 8A to the respective coil groups with lines interconnecting the other two coil groups of phase B similarly. Phase B' in the control winding is defined between leads 9A' and 3' to the respective coil groups with lines interconnecting the other two coil groups of B' similarly. Phase C is defined between leads 3 and 9A to the respective coil groups with lines interconnecting the other two coil groups of phase C similarly. Phase C' is defined between leads 4' and 7' to the respective coil groups with lines interconnecting the other two coil groups of C' similarly. From the description of connecting the coil groups of phases A and A', it will be obvious to anyone skilled in the art how the coil groups of phases B, B', C and C' are connected.

In FIGS. 6 and 7 the magnetic poles are indicated by the dashed lines 32a, 32b, 32c and 32d for the main windings and 34a, 34b, 34c and 34d for the control windings. FIG. 7 illustrates linerally the relationship of the various magnetic poles, and the coils constituting such poles. Arrow 52 indicates the direction of viewing the poles. The center of each pole of the main winding passes through phase B, and the center of the control winding poles pass through the winding B'. Between the phases C and A and C' and A', respectively, are the ends of each of the poles.

The rotor for the motor is indicated by numeral 14 and it will be seen that the main windings in the stator are closer to the rotor 14 and the effect of this is to reduce the leakage reactance of the main winding and thereby minimize losses. In the case where the control winding is located closest to the rotor there would be higher leakage reactance and possible lower efficiency, but the starting torque and breakdown torque would be higher.

The coils of the control windings are wound in an opposite sense to the windings of the main winding such that on no-load or low-load the fluxes generated by the winding of the main and control windings located physically below each other are opposed and the total net flux thereby produced is minimized. As the load increases the current of the control winding begins to lead the main winding current even further and, by virtue of the counterwound effect, this causes flux of the respective main and control windings to increase as their vectors approach an additive position.

In the motor of FIGS. 6 therefore the alignment of the main winding phases and the corresponding control winding phases physically is:

| Main Winding: | A B C | A B C | A B C | A B C |
|---|---|---|---|---|
| Control Winding: | B'C'A' | B'C'A' | B'C'A' | B'C'A' |

Figure 8:
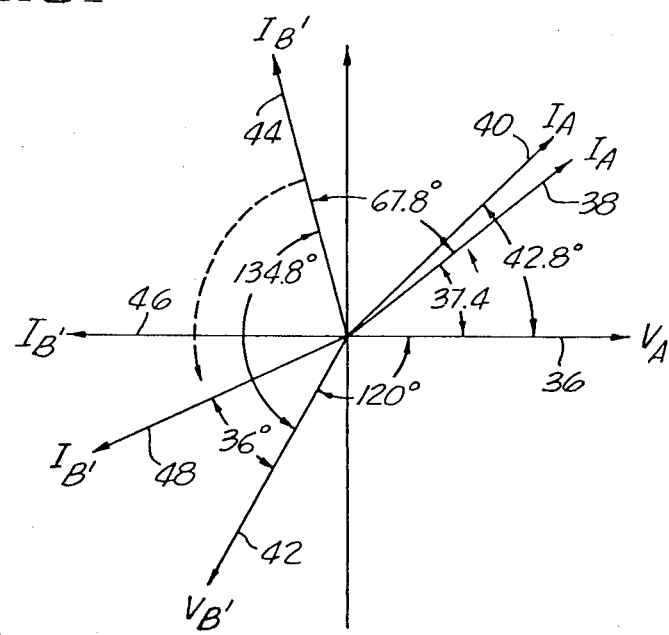
FIG. 8 is a vectorial diagram of the current and voltage characteristics of physically corresponding windings of the main winding and the physically corresponding control winding.

The vectorial representation of the voltage and current through the windings on one radial line is depicted in FIG. 8. Thus in the main winding the voltage and current of phase A is illustrated and in the control winding the voltage and current of phase B' is illustrated the physical locations of these windings being opposite each other. Vector 36 indicates the voltage over the main winding of phase A and vector 38 the current in the phase A winding at no-load. As the load increases the current vector 38 moves to position 40 which represents the overload position. The rated load position is between vectors 38 and 40 but is not shown in the drawings. In the control winding of phase B vector 42 depicts the voltage across this winding which is displaced 120° from the voltage of phase A. At no-load the current is substantially in phase with the vector 38 as is indicated by vector 44.

"In phase" in ideal situations would mean no phase displacement at all and as such a motor would operate efficiently at close to no load. In the sense used in this application "in-phase" must be considered of wider meaning depending on the particular motor itself. In preferred forms of the invention this angle will be between 0° and 60°. Preferably this would be less than 45°, which would be for a situation of a motor operating in a range from no load to rated load. Such a motor would have combined good close to no load characteristics and good full load characteristics. If the in-phase angle were greater than 60° the no load characteristics would deteriorate but efficiencies would improve at overload conditions. In FIG. 8, for example, the in-phase displacement is illustrated as 67.8° at no load. As can be seen from the tables appearing later which refer to the same motor as depicted in the current relationships of FIG. 8 the optimum efficiency is shown at 25% overload. If optimum efficiency was required, for instance at 50% overload this low load phase angle defined above would be even greater than 67.8°.

As the load increases the angle of lead between $I_A$ and $I_B$, moves to position 46 and the relative currents become out of phase. This angle approaches, but does not reach 180° and hence the vectorial sum of the current $I_A$ and $I_B$, is reduced. In this manner the power factor of the motor is increased as the motor is loaded up to rated load. Similar vectorial representations and changes can be shown for the other adjacent phases, namely, B and C', and C and A', respectively.

This optimized flux density is achieved by physically locating adjacently the windings of phases A and B', B and C', C and A' in the manner shown in FIGS. 6 and 7, and employing the currents in these windings as depicted and described in connection with FIG. 8 to generate the consequent net flux by the adjacent windings A and B', B' and C', and C and A', respectively.

The flux density is optimized for the particular load conditions, as is reflected in the vectorial positions of $I_A$ and $I_B$. This in turn minimizes the line current for the particular loading. Thus flux density control results in minimized line currents necessary for particular loading conditions.

Comparatively, in a standard motor the flux density is relatively independent of load and thus the line current is substantially independent of load, there being less difference between no-load and full load. In the present invention, however, the flux densities are more load dependent and hence at lower load points there are reduced line currents, and this produces higher efficiency over the motor operating range and not solely about the rated load point.

Consequently, the motor of the present invention is one having higher efficiency and higher power factor over a far greater range than has previously been possible.

It has also been found that the motor can operate above its rated load at higher efficiency than has previously been possible. In such an overload situation, the vectorial change of the current $I_B$, is such as to change from the position 46 to the position 48. At this point the position of the vectorial displacement between $I_A$ and $I_B$, is slightly less than 180°. Higher power factor and efficient operating conditions prevail.

In tests conducted with a Wanlass motor A18D2 Model F-4427, three phase, one horsepower, 230 volt running at 1755 RPM at rated load and having a breakdown torque of 148 inch.lbs the following relevant data was obtained. A 10 microfarad capacitor was connected in series with each main winding. At low load, the motor output was 0.057 horsepower, and the main windings drew some 510 watts of power while the control windings generated some 390 watts back into the system. This provided an overall efficiency of 35.4%. At 0.341 horsepower the main windings consumed 504 watts while the control windings generated 174 watts back into the system thereby giving a 76.8% efficiency. At rated load the main windings consumed 479 watts and the control windings changed their condition from that of being a power generator to that of being a power consumer, in fact consuming 368 watts, and the overall efficiency was some 87.3%. As the motor was run above rated load to 1.9 horsepower the control windings increasingly drew power and the efficiency became 84.6%. Overall the one horsepower motor effectively operated in the range of 0.5 horsepower to about 2 horsepower at an efficiency in excess of 82.1% which is an improvement over motors in the prior art. As the load of the motor increased, the current of the control windings changed its vectorial position as indicated earlier. Overall the power factor of the motor was in the range between 0.9 and 0.97.

In some forms of the invention it has been found desirable to increase the starting torque and the breakdown torque of the motor by improving the symmetry of the magnetic fields. The physical placement of the main and control windings relative to each other as depicted in FIGS. 6 and 7 does not provide an exact quadrature relationship physically and magnetically in the three phase, four pole motor. Such a physical quadrature relationship requires the center of the control windings to be between the poles of the main windings, and for this purpose it is necessary to move the windings relative to each other by some 30° electrical, namely, some 15° physical. Each slot in a conventional stator depicts a change of 20° electrical (10° physical) and hence in the tested motor the windings were moved over 20° electrical and not the 30° electrical which was physically impossible. This improved the alignment of the center of the poles of the control windings to a point close to the position between the poles of main windings, the misalignment being only some 10° electrical. The symmetry of the magnetic field was accordingly improved. The effect of this adjustment is to cause alignment of the main windings and control windings poles as follows:

| Main Winding: | A B C A B C A B C A B C |
|---|---|
| Control Winding: | C'   A'B'C'   A'B'C'   A'B'C'   A'B' |

The above representation shows an exaggerated spacing between windings C and A, and C' and A', but it is useful in understanding that the center of the poles B and B', respectively, would now fall between the ends of the poles.

The effect of this change was to improve the starting torque and breakdown torque without detrimental effect on the remaining load range. In a tested motor the following parameters were achieved:

| Line Voltage | 230$^V$ |
|---|---|
| Capacitor in Main Winding | 10 Microfarad |
| Breakdown Torque 146 inch.lb | At 1203 RPM |
| Starting Torque | 119 inch.lb |
| Locked Rotor Total Current | 19.3 Amperes |
| Rated Load | = 36 inch.lb at 1755 RPM = 1.003 HP |
| Input Power | = 857 Watts |
| Efficiency | 87.3% |
| Power Factor | 0.94 |

The parameters of the motor when operated in overload conditions of 25% were:

| Line Voltage | 230$^V$ |
|---|---|
| Capacitor in Main Winding | 10 Microfarad |
| Breakdown Torque 146 inch.lb. | At 1203 RPM |
| Starting Torque | 119 inch.lb |
| Locked Rotor Total Current | 19.3 Amperes |
| Overload of 25% | = 45 inch.lb at 1740 RPM = 1.243 HP |
| Input Power | = 1056 Watts |
| Efficiency | 87.8% |
| Power Factor | 0.95 |

The changeover of the control windings from a generative phase to a motoring phase occurred at approximately 24 inch.lb. This represented an overall increase in starting torque of some 23% and in breakdown torque of some 19% compared with the nonsymmetrical, physically unshifted motor described earlier.

In other examples of the motor or machine having a different number of magnetic poles, for instance, two poles or six poles the angular arrangements and vectorial representations would be different. Further the number of slots by which the windings of the motor would be moved to obtain optimum vectorial disposition would be different. Likewise the number of phases of the machine would call for different parameters.

No attempt has been made to illustrate the manner in which the three coils of the polyphase main stator winding would be physically wound on the stator core as any conventional technique such as lap winding or concentric winding would be satisfactory as will be readily apparent to one skilled in the art. Similarly, the construction of the rotor has not been illustrated as any suitable rotor, i.e., a squirrel cage or wound rotor could be used.

In another example of the invention, motors could, for instance, be wired according to dual voltage techniques of double windings.

The invention also has application situations where existing motors are to be rewound and constructed in the manner herein described. In such a situation the standard motor frame provides a stator which has that quantity of magnetic material necessary for operation under existing standard designs. However, when reconstructed in terms of the present invention and designed to operate at its rated output it will not be necessary to employ all the magnetic material which is available. In such examples the motor will be wound so that the voltage across the capacitor added to the input voltage will not cause the volt-second capacity of the core to be exceeded and not have the core operate periodically between saturated and non-saturated conditions. If the magnetic material in such an instance were used to its maximum capacity in accordance with the invention and the volt-second capacity of the core was exceeded periodically, then the overall rating of the motor would be higher than originally and this may be not as desirable for particular applications where a motor of rated output is required having only better power factor and efficiency characteristics than the standard motor and not increase horsepower output. An advantage of the present invention thus is also that existing motors may be reconstructed in accordance with the invention to operate periodically between saturation and non-saturation conditions and in the manner of the invention such that standard motor frame could now produce higher output and better power factors and higher efficiencies than has previously been possible.

It should be understood that while the foregoing description of the operation of the motor is believed to best describe the physical phenomena present in its operation, it is not meant in any way to limit the scope of the present invention, and that the operation of the motor or machine may some day be better explained.

The term "in phase" has been explained above with regard to the vectorial positions of the currents in the main winding and adjacent control windings. The term "out-of-phase" means a change from the normal "in phase" status between the vectorial positions of these currents. Thus no limitation or value of angle can be imparted to define that vectorial position which will define "out-of-phase."

It should also be understood that the invention is not limited to the particular physical constructions of the motor and machine illustrated and described. The foregoing description is thus meant to be illustrative and exemplary only and not restrictive.

I claim:

1. A polyphase electric machine comprising:
   a stator including a core of magnetic material;
   a rotor;
   a main polyphase stator winding having a winding for each phase wound on said core and encompassing said magnetic material;
   a plurality of input terminals adapted to be connected to a source of polyphase AC voltage;
   a plurality of capacitors;
   means connecting the main windings of each phase in a series circuit with one of said capacitors and said series circuits being connected with said input terminals; and
   a polyphase control winding having a winding for each phase wound on said core to encompass said magnetic material and connected respectively to said plurality of input terminals at least partly in parallel with the respective main windings and the series connected capacitances of each respective phase, such that on low load current flows in opposite directions across radially adjacent windings of the main winding and the control winding and such current flow becomes increasingly in the same direction as the load increases, and wherein respectively different phases of the main windings and control windings are in substantially physical radial alignment.

2. The machine as claimed in claim 1 wherein the main and the control windings each define several magnetic poles, the centers of the poles of the main windings magnetically overlap the magnetic poles of the control windings, and the centers of the poles of the control windings magnetically overlap the magnetic poles of the main windings.

3. The machine as claimed in claim 1 wherein the main and the control windings each define several magnetic poles, the centers of the poles of the control windings being magnetically located substantially between the poles of the main windings.

4. The machine as claimed in either claim 1 or claim 2 wherein the control windings are wound radially outside of the main windings such that the space between the main windings and the rotor substantially minimizes the leakage reactance of the main windings.

5. The machine as claimed in either claim 1 or claim 2 wherein the main windings are wound radially outside of the control windings thereby increasing starting and breakdown torque.

6. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main windings of each phase in a series circuit with one of said capacitors, said series circuits being connected with said input terminals;
a polyphase control winding having a winding for each phase wound on said core to encompass said magnetic material and connected respectively to said plurality of input terminals at least partly in parallel with the respective main windings and the series connected capacitances of each respective phase, such that on low load current flows in opposite directions across radially adjacent windings of the main winding and the control winding and such current flow becomes increasingly in the same direction as the load increases, and wherein there are three phases, the phases of the main windings being designated by letters A, B and C and the phases of the control windings by letters A', B' and C', and wherein the substantial radial physical alignment of the phases of the main and control windings are AB', BC' and CA', respectively.

7. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main windings of each phase in a series circuit with one of said capacitors and said series circuits being connected with said input terminals; and
a polyphase control winding having a winding for each phase wound on said core to encompass said magnetic material and connected respectively to said plurality of input terminals at least partly in parallel with the respective main windings and the series connected capacitances of each respective phase, the control windings and the main windings being wound such that on low load the total net flux density from main and control windings substantially radially adjacent each other is low and with increasing load the total flux density increases as the flux generation of the windings become additive with each other, and wherein respectively different phases of the main winding and control winding are in substantially physical radial alignment.

8. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polphase AC voltage;
a plurality of capacitors;
means connecting the main windings of each phase in a series circuit with one of said capacitors and said series circuits being connected with said input terminals; and
a polyphase control winding having a winding for each phase wound on said core to encompass said magnetic material and connected respectively to said plurality of input terminals at least partly in parallel with the respective main windings and the series connected capacitances of each respective phase, the respective control windings of each phase being physically positioned on the stator so that the vectorial relationship of the currents of the main windings and the currents of the control windings located substantially radially adjacent the main windings cause the vectorial sum of the currents of the respective windings to decrease as the load increases towards full load, and wherein respectively different phases of the main winding and control winding are in substantially physical radial alignment.

9. The machine of claim 8 wherein the control windings and the main windings are wound in an opposite sense such that on low load the total net flux density from respective main and control windings is low and with increasing load the flux density increases as the vectorial position of the current of the corresponding control windings change and cause the flux generation to become substantially additive with each other.

10. The machine as claimed in either claim 8 or claim 9 wherein the main and the control windings each define several magnetic poles, the centers of the poles of the main windings magnetically overlap the magnetic poles of the control windings, and the centers of the poles of the control windings magnetically overlap the magnetic poles of the main windings.

11. The machine as claimed in either claim 8 or claim 9 wherein the main and the control windings each define several magnetic poles, the centers of the poles of the control windings being electrically located substantially between the poles of the main windings.

12. The machine as claimed in claim 8 or claim 9 wherein the control windings are wound radially outside of the main windings such that the space between the main windings and the rotor substantially minimizes the leakage reactance of the main windings.

13. The machine as claimed in claim 10 wherein the control windings are wound radially outside of the main windings such that the space between the main windings and the rotor substantially minimizes the leakage reactance of the main windings.

14. The machine as claimed in claim 11 wherein the control windings are wound radially outside of the main windings such that the space between the main windings and the rotor substantially minimizes the leakage reactance of the main windings.

15. A polyphase electric motor comprising a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main windings of each phase in a series circuit with one of said capacitors and said series circuits being connected with said input terminals; and
a polyphase control winding having a winding for each phase wound on said core to encompass said magnetic material and connected respectively to said plurality of input terminals at least partly in parallel with the respective main windings and the series connected capacitances of each respective phase, such that on low load current flows in opposite directions across radially adjacent windings of the main winding and the control winding, and such current flow becomes increasingly in the same direction as the load increases, and wherein respectively different phases of the main winding and control winding are in substantially physical radial alignment.

16. The motor as claimed in claim 15 wherein the main and the control windings each define several magnetic poles, the centers of the poles of the main windings magnetically overlap the magnetic poles of the control windings, and the centers of the poles of the control windings magnetically overlap the magnetic poles of the main windings.

17. The motor as claimed in claim 15 wherein the main and the control windings each define several magnetic poles, the centers of the poles of the control windings being magnetically located substantially between the poles of the main windings.

18. The motor as claimed in either claim 15 or claim 16 wherein the control windings are wound radially outside of the main windings such that the space between the main windings and the rotor substantially minimizes the leakage reactance of the main windings.

19. The motor as claimed in either claim 15 or claim 16 wherein the main windings are wound radially outside of the control windings thereby to increase starting and breakdown torque.

20. A polphase electric motor comprising a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main windings of each phase in a series circuit with one of said capacitors and said series circuits being connected with said input terminals;
a polyphase control winding having a winding for each phase wound on said core to encompass said magnetic material and connected respectively to said plurality of input terminals at least partly in parallel with the respective main windings and the series connected capacitances of each respective phase, such that on low load current flows in opposite directions across radially adjacent windings of the main winding and the control winding, and such current flow becomes increasingly in the same direction as the load increases, and wherein there are three phases, the phases of the main windings being designated by letters A, B and C and the phases of the control windings by letters A', B' and C', and wherein the substantial radial physical alignment of the phases of the main and control windings are AB', BC' and CA', respectively.

21. The motor as claimed in either claim 15 or claim 16 wherein there are three phases and the vectorial current relationship of the main windings with the current of the radially adjacent control windings on no-load are substantially in phase, and becomes increasingly out of phase on increasing loading.

22. The motor as claimed in either claim 15 or claim 16 in which the main windings and the capacitors are connected in a wye configuration, and the control windings are connected in a wye configuration.

23. The motor as claimed in claim 17 in which the main windings and the capacitors are connected in a wye configuration, and the control windings are connected in a wye configuration.

24. The motor as claimed in claim 18 in which the main windings and the capacitors are connected in a wye configuration, and the control windings are connected in a wye configuration.

25. The motor as claimed in claim 20 in which the main windings and the capacitors are connected in a wye configuration, and the control windings are connected in a wye configuration.

26. The motor as claimed in claim 21 in which the main windings and the capacitors are connected in a wye configuration, and the control windings are connected in a wye configuration.

27. The motor as claimed in either claim 15 or claim 16 in which the main windings and the capacitors are connected in a delta configuration, and the control windings are connected in a delta configuration.

28. The motor as claimed in claim 17 in which the main windings and the capacitors are connected in a delta configuration, and the control windings are connected in a delta configuration.

29. The motor as claimed in claim 18 in which the main windings and the capacitors are connected in a delta configuration, and the control windings are connected in a delta configuration.

30. The motor as claimed in claim 20 in which the main windings and the capacitors are connected in a delta configuration, and the control windings are connected in a delta configuration.

31. The motor as claimed in claim 21 in which the main windings and the capacitors are connected in a delta configuration, and the control windings are connected in a delta configuration.

32. The motor as claimed in either claim 15 or claim 16 in which the main windings and capacitors are connected in a wye configuration, and the control windings are connected in a delta configuration.

33. The motor as claimed in either claim 15 or claim 16 in which the main windings and the capacitors are connected in a delta configuration, and the control windings are connected in a wye configuration.

34. A polyphase electric motor comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main windings of each phase in a series circuit with one of said capacitors and said series circuits being connected with said input terminals; and
a polyphase control winding having a winding for each phase wound on said core to encompass said magnetic material and connected respectively to said plurality of input terminals at least partly in parallel with the respective main windings and the series connected capacitances of each respective phase, the control windings and the main windings being wound such that on low load the total net flux density from main and control windings substantially radially adjacent each ther is low and with increasing load the total flux density increases as the flux generation of the windings become additive with each other, and wherein respectively different phases of the main winding and control winding are in substantially physical radial alignment.

35. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main winding of each phase in a series circuit with one of said capacitors and said series circuits being connected with said input terminals;
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage; and
a polyphase control winding having a winding for each phase wound on said core to encompass said magnetic material and connected respectively to said plurality of input terminals at least partly in parallel with the respective main windings and the series connected capacitances of each respective phase, the respective control windings of each phase being positioned on the stator so that the vectorial relationship of the currents of the main windings and the currents of the control windings located substantially radially adjacent the main windings cause the vectorial sum of the currents of the respective windings to decrease as the load increases towards full load, and wherein respectively different phases of the main winding and control winding are in substantially physical radial alignment.

36. The machine of claim 35 wherein the control windings and the main windings are wound in an opposite sense such that on low load the total net flux density from respective main and control windings is low and with increasing load the flux density increases as the vectorial position of the current of the corresponding control windings change and cause the flux generation to become substantially additive with each other.

37. The machine as claimed in either claim 35 or claim 36 wherein the main and the control windings each define several magnetic poles, the centers of the poles of the main windings magnetically overlap the magnetic poles of the control windings, and the centers of the poles of the control windings magnetically overlap the magnetic poles of the main windings.

38. The machine as claimed in either claim 35 or claim 36 wherein the main and the control windings each define several magnetic poles, the centers of the poles of the control windings being magnetically located substantially between the poles of the main windings.

39. The machine as claimed in claim 35 or claim 36 wherein the control windings are wound radially outside of the main winding such that the space between the main winding and the rotor substantially minimizes the flux leakage reactance of the main windings.

40. The machine as claimed in claim 37 wherein the control windings are wound radially outside of the main winding such that the space between the main winding and the rotor substantially minimizes the leakage reactance of the main windings.

41. The machine as claimed in claim 38 wherein the control windings are wound radially outside of the main winding such that the space between the main winding and the rotor substantially minimizes the leakage reactance of the main windings.

42. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main winding of each phase in a series circuit with one of said capacitors and said series circuits being connected with said input terminals;
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage;
a polyphase control winding having a winding for each phase wound on said core to encompass said magnetic material and connected respectively to said plurality of input terminals at least partly in parallel with the respective main windings and the series connected capacitances of each respective phase, the respective control windings of each phase being positioned on the stator so that the vectorial relationship of the currents of the main windings and the currents of the control windings located substantially radially adjacent the main windings cause the vectorial sum of the currents of the respective windings to decrease as the load increases towards full load, or claim 36 and wherein there are three phases, the phases of the main winding being designated by letters A, B and C and the phases of the control winding by letters A', B' and C', and wherein the substantial radial alignment of the phases of the main and control windings are AB', BC' and CA', respectively.

43. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main winding of each phase in a series circuit with one of said capacitors and said series circuits being connected with said input terminals;
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage; and
a polyphase control winding having a winding for each phase wound on said core to encompass said magnetic material and connected respectively to said plurality of input terminals at least partly in parallel with the respective main windings and the series connected capacitances of each respective phase, the control windings and the main windings being wound in an opposite sense such that on low load the total net flux density from main and control windings substantially radially adjacent each other is low and with increasing load the total flux density increases as the flux generation of the windings become additive with each other, and wherein respectively different phases of the main winding and control winding are in substantially physical radial alignment.

44. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main winding of each phase in a series circuit with one of said capacitors and said series circuits being connected with said input terminals, said capacitors being capable of being charged so that the stator core will periodically change nonlinearly from non-saturated to a saturated condition; and a polyphase control winding having a winding for each phase wound on said core to encompass said magnetic material and connected respectively to said plurality of input terminals at least partly in parallel with the respective main windings and the series connected capacitances of each respective phase, the respective control windings of each phase being positioned on the stator so that the vectorial relationship of the currents of the main windings and the currents of the control winding located radially adjacent the main winding cause the total current of the respective windings to decrease as the load increases towards full load, and wherein respectively different phases of the main winding and control winding are in substantially physical radial alignment.

45. The machine of claim 46 wherein the control windings and the main windings are wound in opposite sense such that on low load the total flux density from each phase is low and with increasing load the flux density increases as the vectorial position of the current of the corresponding control winding changes and causes the flux generation to become substantially additive with each other.

46. The machine as claimed in claim 44 or claim 45 wherein the control winding is wound radially outside of the main winding such that the space between the main winding and the rotor substantially minimizes the leakage reactance of the main winding.

47. A polyphase electric machine comprising:
a stator including a core of magnetic material;
a rotor;
a main polyphase stator winding having a winding for each phase wound on said core and encompassing said magnetic material;
a plurality of input terminals adapted to be connected to a source of polyphase AC voltage;
a plurality of capacitors;
means connecting the main winding of each phase in a series circuit with one of said capacitors and said series circuits being connected with said input terminals, said capacitors being capable of being charged so that the stator core will periodically change nonlinearly from non-saturated to a saturated condition;
a polyphase control winding having a winding for each phase wound on said core to encompass said magnetic material and connected respectively to said plurality of input terminals at least partly in parallel with the respective main windings and the series connected capacitances of each respective phase, the respective control windings of each phase being positioned on the stator so that the vectorial relationship of the currents of the main windings and the currents of the control winding located radially adjacent the main winding cause the total current of the respective windings to decrease as the load increases towards full load, and wherein there are three phases, the phases of the main winding being designated by letters A, B and C and the phases of the control winding by letters A', B' and C' and wherein the substantial radial alignment of the phases of the main and control windings are AB', BC' and CA', respectively.

48. A polyphase electric motor comprising:
a stator including a core of magnetic material;
a rotor;

a main polyphase stator winding having a winding for each phase wound on said core and encompassing said magnetic material;

a plurality of input terminals adapted to be connected to a source of polyphase AC voltage;

a plurality of capacitors;

means connecting the main windings of each phase in a series circuit with one of said capacitors and said series circuits being connected with said input terminals; and a polyphase control winding having a winding for each phase wound on said core to encompass said magnetic material and connected respectively to said plurality of input terminals at least partly in parallel with the respective main windings and the series connected capacitances of each respective phase, the control windings and the main windings being wound in an opposite sense, the control winding acting as a generating winding at no load and switching progressively towards a motor winding as the load increases, and wherein respectively different phases of the main winding and control winding are in substantially physical radial alignment.

49. The machine as claimed in claim 7 wherein the control windings and radially adjacent main windings are wound in an opposite sense.

50. The machine as claimed in either claim 1 or claim 9 where the opposite sense is achieved by the main windings and the radially adjacent control windings being oppositely wound.

51. The motor as claimed in claim 34 wherein the control windings and the radially adjacent main windings are wound in an opposite sense.

52. The machine as claimed in claim 6, wherein the main and the control windings each define several magnetic poles, the centers of the poles of the main windings magnetically overlap the magnetic poles of the control windings, and the centers of the poles of the control windings magnetically overlap the magnetic poles of the main windings.

53. The motor as claimed in claim 20, wherein the main and the control windings each define several magnetic poles, the centers of the poles of the main windings magnetically overlap the magnetic poles of the control windings, and the centers of the poles of the control windings magnetically overlap the magnetic poles of the main windings.

54. The machine of claim 42, wherein the control windings and the main windings are wound in an opposite sense such that on low load the total net flux density from respective main and control windings is low and with increasing load the flux density increases as the vectorial position of the current of the corresponding control windings change and cause the flux generation to become substantially additive with each other.

55. The machine of claim 47, wherein the control windings and the main windings are wound in opposite sense such that on low load the total flux density from each phase is low and with increasing load the flux density increases as the vectorial position of the current of the corresponding control winding changes and causes the flux generation to become substantially additive with each other.

56. A polyphase electric machine comprising:

a stator including a core of magnetic material;

a rotor;

a main polyphase stator winding having a winding for each phase wound on said core and encompassing said magnetic material;

a plurality of input terminals adapted to be connected to a source of polyphase AC voltage;

a plurality of capacitors;

means connecting the main windings of each phase in a series circuit with one of said capacitors, said series circuits being connected with said input terminals;

a polyphase control winding having a winding for each phase wound on said core to encompass said magnetic material and connected respectively to said plurality of input terminals at least partly in parallel with the respective main windings and the series connected capacitances of each respective phase, such that on low load current flows in opposite directions across radially adjacent windings of the main winding and the control winding and such current flow becomes increasingly in the same direction as the load increases, and wherein there are three phases, and wherein the substantial radial physical alignment of the phases of the main winding and the phases of the control winding respectively are the first phase of the main winding and the second phase of the control winding, second phase of the main winding and third phase of the control winding, and the third phases of the main winding and the first phase of the control winding.

* * * * *